United States Patent Office 2,879,670
Patented Mar. 31, 1959

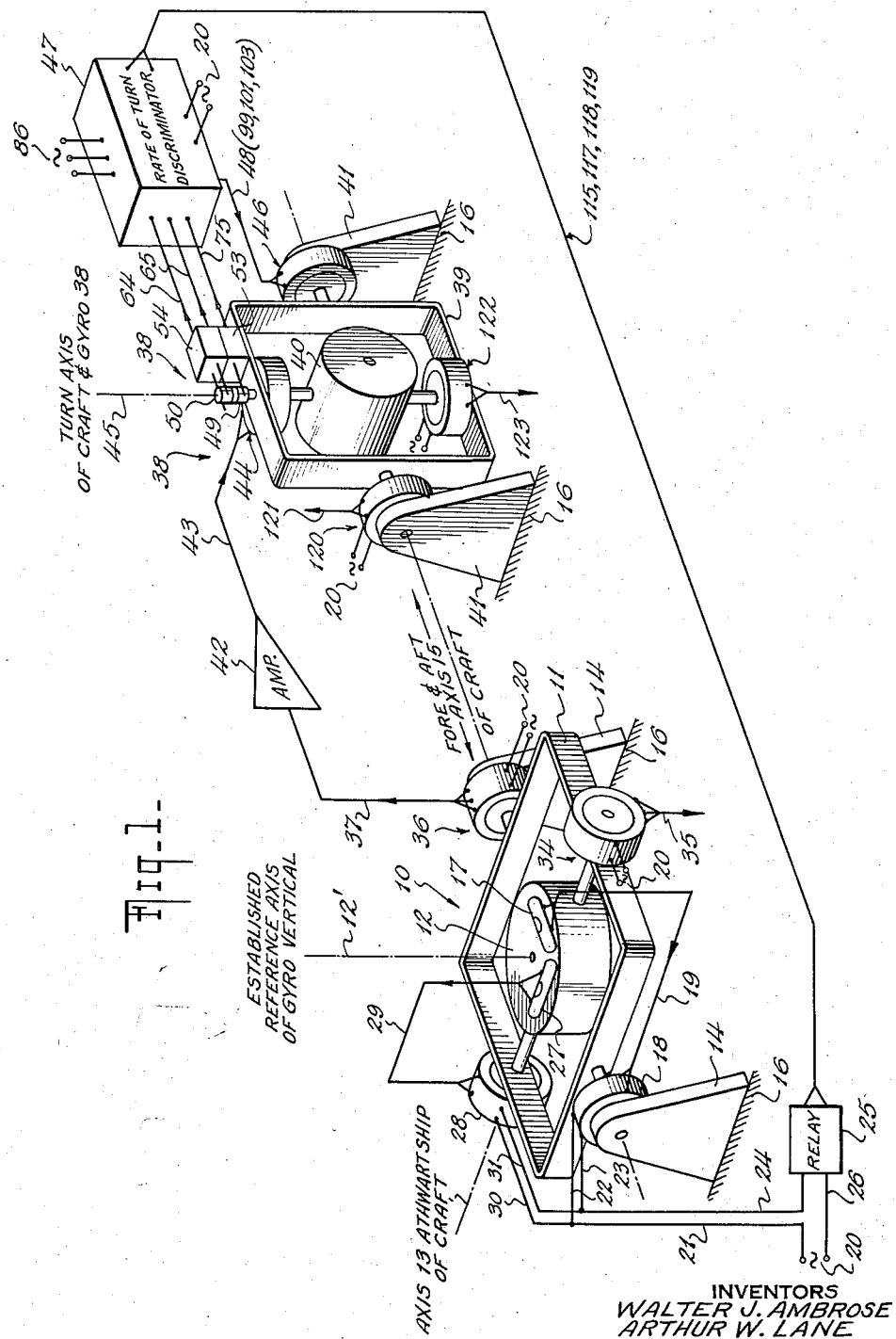

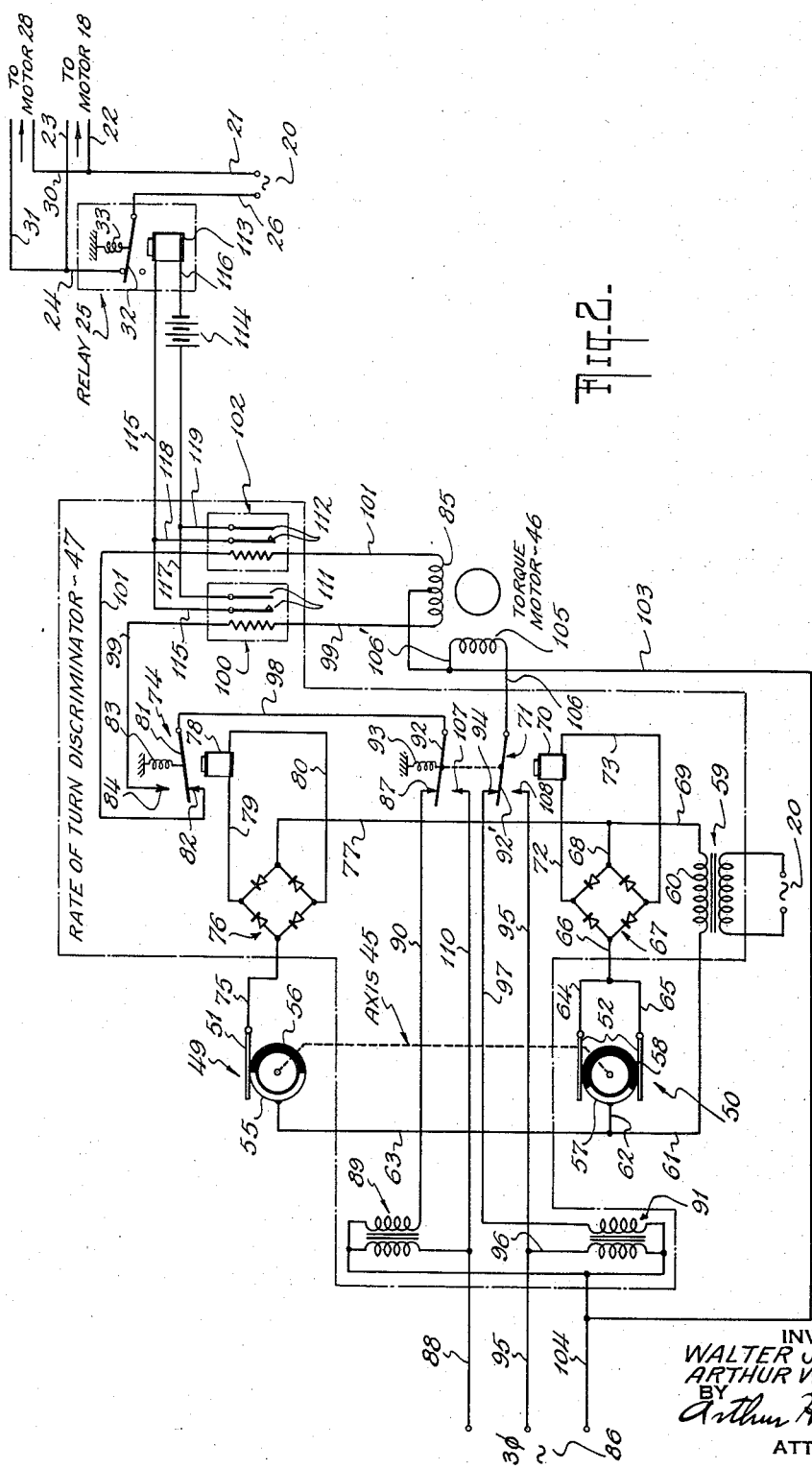

2,879,670

GYROSCOPIC SYSTEMS

Walter J. Ambrose, Huntington, and Arthur W. Lane, Roosevelt, N.Y., assignors to Sperry Rand Corporation, a corporation of Delaware Application November 8, 1956, Serial No. 621,491

17 Claims. (Cl. 74—5.34)

This invention relates to an improvement in gyroscopic systems for dirigible craft. The system provides an instrument for sensing turns of the craft about an axis as well as a turn responsive device operable to disable the normally effective erection controls of the gyro vertical component thereof. No additional components are required in the improved system to obtain automatic cut-off of the gravitational controls for the provided reference during turns of the craft at a turn rate above a predetermined level.

The improved system further provides a gyroscopic reference for the craft that includes a stabilizing means such as a gyro vertical that defines the primary vertical reference and a second gyroscope of the three degree of freedom type that has at least one axis thereof controlled by or slaved to the reference provided by the gyro vertical, and provides a turn reference. In accordance with the invention, the second or turn reference gyroscope of the combination is controlled about its turn axis with relation to the craft by a slaving means of the character that discriminates between craft turn rates above and below a predetermined value.

One of the objects of the present invention is to provide a system of the character described wherein the second gyroscope is slaved in relation to the craft by a low torque when the craft turn rate is below the predetermined value and is further slaved by a high torque when the craft turn rate is above the predetermined value. Accordingly, the system provides an instrument that discriminates between craft turn rates above and below a predetermined value.

Another object of the invention is to utilize the discriminative controls of the system to cut-off or render ineffective the erecting means of the gyro vertical or vertical reference component thereof when the turn rate of the craft is above the predetermined value.

One of the features of the invention is provided by the inclusion in the system of a high and low slaving torque discriminator whose operations are dependent upon the degree of relative displacement between the gimbal ring and rotor frame of the second gyroscope from a null or no-signal condition.

Other objects, features and structural details of the invention will be apparent from the following description when read in relation to the accompanying drawings, wherein—

Fig. 1 is a combination mechanical and electrical schematic view showing a gyroscopic system embodying the present inventive concepts, and Fig. 2 is a detail wiring diagram of the discriminating element of the combination showing a preferred embodiment of the contents of the part noted in Fig. 1 as a rate of turn discriminator in relation to the other electrical components of the system.

The improved system as illustrated particularly in Fig. 1 includes a suitable vertical reference device in the form of a gyro vertical designated at 10. This device provides the means for stabilizing the second gyroscope of the combination about one of its axes and as represented herein this device is a conventional vertical axis defining gyroscopic structure that is erected to gravity vertical or the geo-vertical by suitable gravitational responsive controlling means. As depicted, the components of the gyro vertical include a gimbal ring 11, and a closed case or rotor bearing frame 12 supporting a gyroscope rotor mounted therein to spin about a substantially normally vertical axis 12'. Axis 12' is designated in Fig. 1 as the established reference axis of the gyro vertical. The arrangement of the described elements provide a universal mounting for the case 12 with relation to the craft which mounting includes mutually perpendicular, normally horizontal, major and minor axes 15 and 13, respectively. Suitable trunnions and bearings interconnect the case 12 and ring 11 to support the case 12 with freedom about the minor axis 13 of the mounting. This axis is normally horizontal and athwartship of the craft. The major axis 15 of support for the case 12 is provided by suitable trunnions on the ring 11 which are rotatably mounted by suitable bearings, in a pair of spaced support elements 14 fixed to the craft, with freedom about a normally horizontal axis 15 fore and aft of the craft. It will be understood that as herein represented, the base of the support element 14 is suitably attached to the framework or fuselage 16 of the dirigible craft or aircraft in which the system is incorporated. Major axis 15 of the gyro vertical is coincident with or parallel to the roll axis of the craft depending on the location of the gyro vertical 10 in the craft. The indicated minor axis 13 of the instrument is likewise positioned in relation to the pitch axis of the craft. The gyro vertical of the system is accordingly a reference instrument with mutually perpendicular, normally horizontal axes corresponding to the respective pitch and roll axes of the craft.

The provided erecting means establishes the vertical reference axis 12' of the gyro vertical component of the system. The erecting means shown in the drawing is a conventional gravity responsive controller for the case 12 that includes a pitch tilt detecting liquid level 17 that is fixedly mounted on the case 12. Level 17 is energized from a suitable source of alternating current energy to provide a reversible phase signal output upon tilt of the case 12 in relation to the ring 11 about axis 13 from a level condition, the amplitude of the signal depending on the magnitude of the tilt angle and the phase of the signal depending on the tilt direction. As shown in Fig. 1, the output signal of the level 17 is fed the control winding of a suitable alternating current torque motor 18 by way of lead 19. The stator part of the torque motor 18 is fixed to one of the supports 14 and the rotor thereof is fixed to one of the trunnions of the gimbal ring 11. With the fixed field winding of motor 18 energized from the alternating current source indicated at 20 by way of input leads 21, 22 and return leads 23, 24, closed relay 25 and lead 26, the motor operates with an input or tilt signal from the level 17 to exert a torque about axis 15 of the instrument that is effective to precess the case to a tilt free condition about axis 13. With the case 12 restored to a level condition about axis 13, there is no signal output from the level and the torque motor is returned to a non-operating condition. A similar gravitational control is provided for the roll axis of the instrument by a roll tilt detecting liquid level 27 that is fixed to the case 12 in a position to provide an output signal with tilt of the case about the axis 15 from a level or null condition. Level 27 controls the operation of a torque motor 28 similar to motor 18 by way of lead 29. In the arrangement provided, the stator of motor 28 is fixed to the ring 11 and the rotor is fixed to one of the trunnions extending from the case 12. Motor 28 is accordingly effective to exert a torque about the axis 13 of the instrument to precess the case 12 about axis 15 to restore the case and liquid level 27 to a tilt-free condition. Operations of the motor 28 are also dependent upon the existence of a closed circuit to the source 20 by way of relay 25 by a parallel circuit that includes input lead 30 connected to lead 21 and return lead 31 connected to lead 24. The relay 25 of the described arrangement provides a means for disabling the gyro vertical erecting means of the system. Relay 25 operates to open the circuit to the fixed field windings of the torque motors 18, 28 and thereby prevent operation of the same regardless of the output of the liquid levels 17, 27. The armature 32, Fig. 2, of relay 25, is normally biased by spring 33 to a position in which the circuit between the source 20 and the fixed field windings of the respective torque motors 18 and 28 is closed so that the erecting means of the system is normally effective. The relay 25 accordingly also constitutes a normally ineffective means that is operable to disable or cut-off the gyro vertical erecting means.

The gyro vertical instrument shown further includes electrical synchros or pick-offs of a conventional selsyn type whose respective output signals vary in accordance with departures of the craft from a level attitude condition about its pitch and roll axes. As illustrated, the pitch synchro 34 has a stator element fixed to the ring 11 with an output lead 35. The rotor element of this synchro is fixed to one of the trunnions extending from the case 12. Similarly, the roll synchro 36 has a stator element fixed to one of the supports 14 with an output lead 37. The rotor of the synchro 36 is fixedly connected to one of the extending trunnions of the ring 11.

In accordance with the present inventive concepts, the improved gyroscopic system includes a second gyroscopic instrument of the three degree of freedom type and is designated at 38 in Fig. 1. As shown, the gyroscope 38 is provided with representative ring, case and mounting support components of the same general character as the similarly termed elements of gyroscope 10. For gyroscope 38, the ring is indicated at 39, the rotor case or frame at 40 and the spaced mounting supports at 41. It will be understood that the supports 14 and 41 provided for the respective gyroscopes could be separate housings or a unitary package by which the same are fixedly attached to the craft. As shown in Fig. 1, the ring 39 of the three degree of freedom gyroscope 38 is carried by the supports 41 with the craft with freedom about an axis corresponding to one of the normally horizontal axes of the gyro vertical 10. The major axis of the gyroscope 38 or support axis of the ring 39 is specifically arranged in the embodiment of the invention shown in Fig. 1 to correspond with the normally horizontal roll or fore and aft axis 15 of the craft. Major axis 15 is accordingly common to both gyroscopes 10 and 38. As far as the functioning of the improved systm is concerned as a turn sensing device, the ring 39 could with equal facility be located on the craft with freedom about a support axis that is parallel to or coincident with the pitch axis or athwartship axis 13 of the gyro vertical. The system provides stabilization for the ring 39 of gyroscope 38 about its horizontal axis whether the same be located athwartship or fore and aft with respect to the craft. The gyro vertical 10 of the combination provides this stabilization which is obtained in the arrangement of components illustrated by feeding the output of the roll synchro 36 by way of lead 37, amplifier 42 and lead 43 to the control winding of a torque motor 44. Motor 44 is similar to torque motor 28 of the gyro vertical 10 inasmuch as its stator part is fixedly mounted in the ring 39 and its rotor is secured to one of the extending trunnions from the case 40 containing the spinning gyroscopic rotor. Motor 44 is effective to precess the ring 39 about its major axis 15 to maintain the ring tilt free with respect to the roll axis of the craft as controlled by the reference gyro. This maintains the minor axis 45 of the gyroscope 38 or support axis of case 40 in correspondence with the geovertical or azimuthal or earth referenced turn axis of the craft. As far as the inventive concepts herein disclosed are concerned, the support axis of the ring 39 could be oriented athwartship of the craft instead of fore and aft in which case the motor 44 would be operated by the output of synchro 34 of the stabilizing means 10 to provide stabilization about the craft pitch axis. In the arrangement illustrated, the spin axis of the gyroscopic rotor contained in the case 40 is normally parallel to the athwartship axis 13 of the craft. Also, the ring 39 of gyroscope 38 is carried by the craft with freedom about an axis corresponding to the normally horizontal roll or fore and aft axis 15 of the craft. As represented, reference axis 12' and turn axis 45 are in normal parallel relation which is correct when the craft utilizing the system is flying on a straight and level course. In a climb or glide of the craft, axis 12' remains vertical and turn axis 45 becomes inclined to the vertical depending on the pitch attitude of the craft. As the ring 39 is stabilized with respect to craft rolling motions, the axis 45 of gyroscope 38 is also stabilized in roll and thus corresponds to the azimuthal or earth-referenced turn axis of the craft under a banked flight attitude condition. Turns of the craft with respect to the earth (craft in a level pitch attitude) are accordingly sensed by the gyroscope 38 by the degree of relative displacement of the case 40 and ring 39 from a null condition about axis 45 wherein the spin axis of the gyroscopic rotor of the case 40 is perpendicular to the axis 15 of the instrument. If the craft is in a pitched condition, yawing of the craft about its vertical axis will be likewise detected by relative displacement between rotor case 40 and gimbal 39.

The improved system discriminates between turn rates about the axis 45 above and below a predetermined value. The discriminating means distinguishes between left and right craft turns and operates to precess the case 40 about axis 45 at a slow rate when the turn rate of craft is below a predetermined level and at a high rate when the turn rate of the craft is above the predetermined level. To accomplish this result, the gyroscopic instrument 38 includes means for slaving the case 40 with relation to the stabilized ring 39 that includes a selective low and high torque applying means which means includes a suitable torque motor 46. Both low and high torques are exerted about axis 15 of the gyroscope 38 by means of torque motor 46 of similar character to torque motor 18 of the gyroscope 10. In this instance, the stator of motor 46 is fixed to the mounting support 41 on the craft and the rotor thereof is fixedly connected to one of the extending trunnions of the ring 39. The discriminating means of the system provides the necessary output for operating the torque motor 46 at a low energy level when the turn rate is below the predetermined value and at a high energy level when the turn rate is above the predetermined value. As represented in Fig. 1, the output of a rate of turn discriminator generally indicated at 47 is fed to the control winding of the torque motor 46 by way of lead 48.

The slaving and discriminating means provided in the system includes a pair of off-on switches generally indicated at 49 and 50 in Figs. 1 and 2. The switches shown are of the commutator and brush type as shown in more detail in Fig. 2, switch 49 having a single brush 51 and switch 50 having two brushes 52 arranged in parallel spaced relation. The holding pieces for the respective brushes 51 and 52 are connected together and fixedly mounted on the vertical ring 39 of the gyroscope 38 as respectively indicated in Fig. 1 at 53 and 54. As shown, the commutator parts of the respective brushes 50, 51, are fixedly mounted on an extending portion of one of the support trunnions of the case 40, the same being spaced coaxially along the turn axis 45 of the craft or the minor axis of the gyroscope 38. With reference to Fig. 2, the commutator of switch 49 consists of a segmental conducting part 55 and a segmental non-conducting part 56 of substantially equal outside dimensions. The brush 51 of the switch 49 normally contacts the commutator at one of the division lines between the respective segments 55 and 56 as represented in Fig. 2. This position defines the null condition from which relative displacement between the ring 39 and case 40 of the gyroscope 38 is determined. The null condition is one where the spin axis of the rotor of the case 40 is normal to the axis 15 of the ring 39, the parts of the switch 49 being arranged accordingly. With relative displacement between the case 40 and ring 39 from the null condition, the commutator and brush of switch 49 move in relation to one another so that the brush 51 contacts either the conducting segment 55 or non-conducting segment 56 of the considered switch. With a right turn, the displacement of the switch 49 components occurs in one direction. With a left turn, the components of the switch 49 are displaced in the opposite direction. Accordingly, the improved system discriminates between right and left hand turns of the craft.

The commutator part of switch 50 of the system has a conducting segment 57 and a non-conducting segment 58. This arrangement is the same as provided for switch 49 except that the conducting segment 57 has a smaller arcuate peripheral surface than the non-conducting segment 58. Normally, the brushes 52 contact the non-conducting segment 58 of the switch 50 and displacement between the ring 39 and case 40 in the order of twenty degrees is necessary before either brush 52 contacts the segment 57 of the commutator. The selected angular displacement of the parts from a null condition determines the predetermined value below which the portion of the system slaving the case 40 to the ring 39 operates at a low torque level and above which it operates at a high torque level. It also determines the predetermined value for the craft turn rates about axis 45 above and below which the system discriminates. The two brushes 52 included in switch 50 provide left-right turn sensing for the system when it is operating at a high torque level.

As shown in Fig. 2, the components of the rate of turn discriminator indicated generally at 47, include a transformer 59 whose secondary winding 60 is connected to the conducting segments 55 and 57 of the respective switches 49, 50. The primary of the transformer 59 is energized from the suitable single phase alternating current source 20. Leads 61, 62 from one end of the secondary winding 60 connect the same with segment 57. The segment 55 is connected to the transformer secondary winding 60 by way of lead 61 and connecting lead 63. Brush elements 52 of switch 50 are connected to the other end of the transformer secondary winding by way of leads 64, 65, common lead 66, rectifier 67 and leads 68 and 69. The circuit arrangement provided energizes the coil 70 of a double armature relay 71 when either of the brushes 52 contacts the conducting segment 57 of switch 50. As shown, the direct current output of the rectifier 67 is fed the coil 70 of relay 71 by way of leads 72 and 73. Likewise, switch 49 controls the operation of a relay 74, the brush 51 of the switch being connected by lead 75 to a rectifier 76. Alternating current lead 77, to lead 69 connects the rectifier 76 to the secondary winding of the transformer 59. The coil 78 of relay 74 receives the direct current output of the rectifier 76 by way of leads 79 and 80.

Relay 74 of the discriminator 47 controls the sense of operation of the torque motor 46 of the gyroscope 38. When no turn is sensed by the system, the switch 49 and relay 74 combination is effective to control an energizing circuit to the windings of the motor 46 that continuously operates to maintain the gyroscope parts approximately at the null condition described. In effecting this result the brush 51 moves through a very small angular range between the conducting and non-conducting segments 55, 56, respectively, of the switch 49 to alternately cause the relay 74 to open and close. The armature 81 of relay 74 is shown in Fig. 2 as engaging contact 82 against the biasing action of spring 83 which is the condition wherein the brush 51 is on conducting segment 55 and the coil 78 is energized. Operation of the motor 46 results in precession of the case 40 and movement of the commutator of the switch 49 in relation to brush 51 to cause the non-conducting segment 56 to contact the brush. This breaks the supply to the rectifier 76 and deenergizes the coil 78 of the relay 74. This in turn renders the spring 83 effective to move the armature 81 to contact 84 of the relay 74.

The control winding 85 of the torque motor 46 is differentially connected to a three-phase source 86 of alternating current electrical energy through the relay 71 and 74. Relay 71 controlled by switch 50 is effective in the combination to determine the energy level of operation of the motor 46. In the circuitry shown in Fig. 2, energy is supplied the contact 87 of relay 71 by way of lead 88, autotransformer 89 and lead 90. The autotransformers 89 and 91 of the arrangement reduce the energy level of the supply 86. Armature 92 of the relay 71 is shown in Fig. 2 as engaging contact 87 under the influence of spring 93. With the relation of switch 50 parts shown in Fig. 2, the craft is not turning and the coil 70 of the relay 71 is accordingly unenergized. The ganged armatures 92 and 92' of the relay 71 are accordingly positioned by the spring 93 against the respective low energy contacts 87 and 94. As represented, contact 94 is supplied with energy from the source 86 by way of lead 95, lead 96, autotransformer 91 and lead 97. Energy to the control field winding 85 of the motor 46 is fed from the armature 92 of relay 71 by way of lead 98 to the armature 81 of the relay 74. Lead 99 connects one of the ends of the winding 85 through thermal switch 100 to the contact 84 of relay 74. Also, lead 101 connects the opposite end of the winding 85 through thermal switch 102 to the contact 82 of the relay 74. The return circuit from the winding 85 to source 86 is completed through a center tap connected lead 103 to lead 104. In the position of the components shown in Fig. 2, low level energy is supplied only to the right hand portion of the control winding 85 of the motor, the left hand portion of the winding being open circuited. The motor 46 is accordingly conditioned to apply a torque about axis 15 in the proper direction to precess the case 40 to a null condition in relation to ring 39. The motor 46 operates in a reverse sense when the armature 81 of the relay 74 is engaged with contact 84. The fixed field winding 105 of the motor is simultaneously energized at the same energy level from armature 92' of relay 71 by way of input lead 106 and lead 106' to return leads 103, 104 and the source 86.

In turns of the craft about axis 45 the craft moves the ring 39 and the system becomes immediately effective by switch 49 to cause operation of the torque motor 46 at the low energy level in a direction to precess the case 40 to restore the gyroscope 38 to a null condition. If the turn rate is below the designed predetermined rate, the turn proceeds with the case being precessed at a speed that prevents the angular displacement between the switch 50 parts from closing the circuit that energizes the coil 70 of relay 71. If, however, the turn rate is of such magnitude as to exceed the predetermined rate, displacement between the commutator and brush parts 52 of switch 50 is sufficient for one of the brushes depending on the direction of the turn to engage the conducting segment 57 thereof. The coil 70 of relay 71 is then energized, and the ganged armatures 92, 92' are urged against the influence of spring 93 to engage the respective contacts 107 and 108. This directly connects both the control field winding 85 and the fixed field winding 105 of the motor 46 to the supply source 86 and accordingly the motor 46 then operates at the higher energy level. In this regard, supply lead 98 is then connected to source 86 by way of lead 88, lead 110 to lead 88, contact 107 and armature 92 of the relay 71. Lead 106 to the winding 105 is connected to source 86 by way of lead 95 to the contact 108 and armature 92' of relay 71. The return circuit of the motor 46 to the source 86 by way of leads 106 and 103 is the same as that provided at the lower energy level. Switch 50 is accordingly effective to control relay 71 to change the energy level of operation for the torque motor 46, the change being effected when the turn rate of the craft exceeds a predetermined value. At the higher energy level, the case 40 precesses at a higher rate with relation to ring 39 to prevent further relative displacement between the gyroscopic components of the system. As the craft turn rate decreases to null, the system operates in a reverse manner with the slaving means effective through motor 46 gradually restoring the case 40 to a null condition with relation to the ring 39. The system accordingly discriminates between craft turn rates about the axis 45 above and below a predetermined value. Further, the system includes selective low and high torque applying means effective through motor 46 for slaving the case 40 with relation to the ring 39, the discriminator thereof under control of the gyroscope 38 rendering the low torque applying means effective when the craft turn rate about axis 45 is below a predetermined value and rendering the high torque applying means effective when the craft turn rate is above the predetermined value. Also, gyroscope 38 of the system is a three degree of freedom gyro having turn sensitive selective means whose operations are dependent on displacement of the gyroscope from a null condition about its minor axis 45 which corresponds with the turn axis of the craft. The turn sensitive gyroscopic instrument 38 is stabilized about its major axis.

Relay 25 provides the normally ineffective means in the system for disabling the erecting controls of the reference means or gyro vertical 10. In straight flight operations of the craft or where the craft turn rate about axis 45 is below the predetermined turn rate to which the discriminator is sensitive, the switch 32 of the relay 25 is in closed condition so that the fixed field windings of the respective torque motors 18 and 28 are energized from source 20. In this normal condition, the gravitational levels 17 and 27 of the erecting means are effective to operate the torque motors in the normal manner. Such conditions occur when the slaving torque exerted by torque motor 46 or gyroscope 38 is at the low torque level or is null.

When the turn rate of the craft goes above the value predetermined by the system, the torque motor 46 exerts a high slaving torque on the case 40 of gyroscope 38, and the system automatically disables or cuts off the erecting control of reference gyro 10 by energizing relay 25 and accordingly moving the armature 32 thereof to open the fixed field circuit to the respective torque motors 18 and 28. This result is obtained in Fig. 2 through means of the thermal switch elements 100, 102 shown in the input leads 99, 101 to the respective ends of the control field winding 85 of the motor 46. At the higher energy level of operation of motor 46, one of the resistors of the switches 100, 102 depending on the direction of operation of the motor 46 becomes sufficiently heated to close the normal open blade elements. These elements are indicated at 111 and 112 for the respective switches 100, 102. Contacted blade elements 111 close a circuit to the coil 113 of relay 25 by way of an energizing battery 114. This circuit includes lead 115 between one of the blade elements 111 and the coil 113, lead 116 from the other end of the coil 113 to the battery 114 and return lead 117 to the other blade element 111. The circuit for the thermal switch 102 includes lead 118 to connecting lead 115 between the coil 113 and one of the blade elements 112, lead 116 to the battery 114, and return lead 119 to the other of the blade elements 112. The described erection disabling means is responsive to the discriminating means of the system when the turn rate of the craft is above the predetermined value.

Further components of the improved system include a synchro or pick-off 120, Fig. 1, at the axis 15 of the gyroscope 38. The stator and rotor elements of this two part electrical signal generator provide an output in accordance with departure of the craft from a level condition about its roll axis. The output is carried by lead 121. The wound stator of the synchro 120 is suitably fixed to the mounting support 41 and the rotor element thereof is positioned by one of the trunnions of the stabilized ring 39 of the gyroscope 38. The stator part of the synchro is accordingly fixed in relation to the craft while the rotor part is fixed in relation to the gyroscope 38.

Gyroscope 38 of the combination further includes a similar synchro or pick-off 122 that provides an output by way of lead 123 in accordance with the displacement of the case 40 from a null condition with relation to ring 39 about the turn axis 45. The stator of the two part synchro is fixed to the ring 39 while the rotor is fixed to one of the trunnion extensions of the case 40. Two part synchro 122 provides an output in accordance with the displacement of the gyroscope 38 from a null condition about its minor axis 45.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. The combination in a gyroscopic reference system for dirigible craft, of; a gyro vertical with mutually perpendicular, normally horizontal axes corresponding to the pitch and roll axes of the craft, erecting means establishing a vertical reference axis for the gyro vertical, and synchros providing respective outputs in accordance with departures of the craft from a level attitude condition about its pitch and roll axes; a three degree of freedom gyroscope having a ring carried by the craft with freedom about an axis corresponding to one of the normally horizontal axes of the gyro vertical, a rotor case carried by said ring with freedom about a turn axis normally parallel to the reference axis established by the gyro vertical, means responsive to the output of one of said gyro vertical synchros for stabilizing said gyroscope about its ring axis, means for slaving the rotor case with relation to the ring including means for discriminating between craft turn rates about the turn axis above and below a predetermined value, and means for disabling said gyro vertical erecting means responsive to said discriminating means when the turn rate of the craft is above the predetermined value.

2. A system of the character described in claim 1, in which operation of said slaving means is dependent upon the degree of relative displacement of the ring and case from a null condition and said discriminating means includes a first switch operable with a low degree of displacement to control the slaving means at a low energy level and a second switch operable with a higher degree of displacement to control the slaving means at a higher energy level.

3. The combination in a gyroscopic reference system for dirigible craft, of; a gyro vertical with mutually perpendicular, normally horizontal axes corresponding to the pitch and roll axes of the craft, erecting means establishing a vertical reference axis for the gyro vertical, and a synchro providing an output in accordance with departure of the craft from a level condition about its roll axis; a three degree of freedom gyroscope having a ring carried by the craft with freedom about an axis corresponding to the normally horizontal roll axis of the gyro vertical, a rotor case carried by said ring with freedom about an axis normally parallel to the reference axis established by the gyro vertical, means responsive to the ouput of said gyro vertical synchro for stabilizing said gyroscope about its ring axis, means for slaving the rotor case with relation to the ring including means for discriminating between craft turn rates about the turn axis above and below a predetermined value, and means for disabling said gyro vertical erecting means responsive to said discriminating means when the turn rate of the craft is above the predetermined value.

4. A system of the character described in claim 3, in which operation of said slaving means is dependent upon the degree of relative displacement of the ring and case from a null condition and said discriminating means includes a first off-on switch operable with a low degree of displacement to control the slaving means at a low energy level and a second off-on switch operable with a higher degree of displacement to control the slaving means at a higher energy level.

5. In a gyroscopic reference system for dirigible craft, the combination of; a gyro vertical with mutually perpendicular, normally horizontal axes corresponding to the pitch and roll axes of the craft, and synchros providing respective outputs in accordance with departures of the craft from a level attitude condition about its pitch and roll axes; a three degree of freedom gyroscope having a ring carried by the craft with freedom about an axis corresponding to one of the normally horizontal axes of the gyro vertical, a rotor case carried by said ring with freedom about a turn axis normally parallel to the reference axis established by the gyro vertical, means responsive to the output of one of said gyro vertical synchros for stabilizing said gyroscope about its ring axis, means for slaving the rotor case about its turn axis with relation to the ring including selective low and high torque applying means, and discriminating means controlled by said gyroscope for rendering said low torque applying means effective when the craft turn rate about the turn axis is below a predetermined value and for rendering said high torque applying means effective when the craft turn rate is above the predetermined value.

6. The combination claimed in claim 5 including means for erecting said gyro vertical, normally ineffective means operable to disable said gyro vertical erecting means, and means for rendering said normally ineffective means effective upon operation of said high torque applying means.

7. In a gyroscopic reference system for dirigible craft, the combination of, a gyro vertical with mutually perpendicular, normally horizontal axes corresponding to the pitch and roll axes of the craft, and a synchro providing an output in accordance with departure of the craft from a level condition about its roll axis; a three degree of freedom gyroscope having a ring carried by the craft with freedom about an axis corresponding to the normally horizontal roll axis of the gyro vertical, a rotor case carried by said ring with freedom about a turn axis normally parallel to the reference axis established by the gyro vertical, means for slaving the rotor case about its axis with relation to the ring including selective low and high torque applying means, and discriminating means controlled by said gyroscope for rendering said low torque applying means effective when the craft turn rate about the turn axis is below a predetermined value and for rendering said high torque applying means effective when the turn rate is above the predetermined value.

8. The combination claimed in claim 7, including means for erecting said gyro vertical, normally ineffective means operable to disable said gyro vertical erecting means, and means for rendering said normally ineffective means effective upon operation of said high torque applying means.

9. A system for sensing turns of a dirigible craft including a gyroscope of the three degree of freedom type with mutually perpendicular ring, case and spin axes having a ring carried by the craft with freedom about an axis corresponding to one of the normally horizontal craft axes, means for stabilizing said ring about its axis, a rotor case carried by said ring having freedom about a turn axis, turn sensing means for slaving said rotor case with relation to said ring including selective low and high torque applying means, and switching means operable with angular displacement of said case from a null condition about its axis for effecting energization of said low torque applying means when the craft turn rate is below a predetermined value and for effecting energization of said high torque applying means when the craft turn rate is above the predetermined value.

10. A system for sensing turns of a dirigible craft including a gyroscope of the three degree of freedom type with mutually perpendicular ring, case and spin axes having a ring carried by the craft with freedom about an axis corresponding to the roll axis of the craft, means for stabilizing said ring about its axis, a rotor case carried by said ring having freedom about a turn axis, and means dependent upon displacement of the case from a null condition about its axis for sensing and discriminating between right and left craft turns at rates above and below a predetermined value including low and high slaving torque exerting means operable at a low energy level when the craft turn rate is below the predetermined value and at a high energy level when the craft turn rate is above the predetermined value.

11. A system for sensing turns of a dirigible craft including a gyroscope of the three degree of freedom type carried by the craft having a normally horizontal major axis and a normally vertical minor axis, means for stabilizing said gyroscope about its major axis, and turn sensitive selective means dependent upon displacement of the gyroscope from a null condition about its minor axis for exerting a low slaving torque about said major axis when the craft turn rate is below a predetermined value and for exerting a high slaving torque about said major axis when the craft turn rate is above the predetermined value.

12. A system of the character claimed in claim 11, in which said selective means includes a pair of electrical switches, one of which determines the sense of the slaving torque and the other of which determines the level of the slaving torque.

13. A system of the character claimed in claim 11, in which the major axis of the gyroscope corresponds with the roll axis of the craft, and includes a two part synchro providing an output in accordance with departure of the craft from a level condition about its roll axis, one of the parts being fixed in relation to the craft, and the other being fixed in relation to the gyroscope.

14. A system of the character claimed in claim 11, in which the major axis of the gyroscope corresponds with the roll axis of the craft, and includes a two part synchro providing an output in accordance with the displacement of the gyroscope from a null condition about its minor axis.

15. The combination in a gyroscopic reference system for dirigible craft, of, a gyro vertical having erecting means, normally ineffective means for disabling said erecting means, a gyroscope of the three degree of freedom type carried by the craft having a normally horizontal major axis and a normally vertical minor axis, means operated by said gyro vertical for stabilizing said gyroscope about its major axis, turn sensitive selective means dependent upon displacement of the gyroscope from a null condition about its vertical axis for exerting low and high slaving torques on said major axis, and means dependent upon operation of said selective means at a high slaving torque level for rendering said disabling means effective.

16. A gyroscopic system for sensing turns of a dirigible craft about an axis including a three degree of freedom gyroscope having a first axis bearing a fixed relation to the craft and a second axis perpendicular to the first axis and corresponding to the turn axis of the craft, means for stabilizing said gyroscope about said first axis, and left-right turn discriminating means operable to precess said gyroscope about its second axis at a slow rate when the turn rate of the craft is below a predetermined level and at a high rate when the turn rate of the craft is above the predetermined level.

17. A system of the character claimed in claim 16, in which said stabilizing means includes a gyro vertical; means for erecting said gyro vertical, normally ineffective means for disabling said erecting means, and means for rendering said disabling means effective when said discriminating means is effective to precess said gyroscope at a high rate.

References Cited in the file of this patent

UNITED STATES PATENTS

| | | |
|---|---|---|
| 2,504,170 | Wong | Apr. 18, 1950 |
| 2,513,329 | Johnson | July 4, 1950 |
| 2,586,817 | Harris | Feb. 26, 1952 |
| 2,678,564 | Douglas et al. | May 18, 1954 |
| 2,699,681 | Johnson | Jan. 18, 1955 |